United States Patent [19]

O'Mahony et al.

[11] Patent Number: 4,626,434
[45] Date of Patent: Dec. 2, 1986

[54] FRUIT INFUSION USING A SYRUP WHICH HAS BEEN SUBJECTED TO ENZYME TREATMENT AND CONCENTRATED

[75] Inventors: John S. O'Mahony, Amherst; Marvin L. Kahn, Williamsville; Satya N. Adapa, Derby, all of N.Y.

[73] Assignee: Rich Products Corporation, Buffalo, N.Y.

[21] Appl. No.: 775,503

[22] Filed: Sep. 12, 1985

Related U.S. Application Data

[62] Division of Ser. No. 466,411, Feb. 15, 1983, Pat. No. 4,551,348.

[51] Int. Cl.⁴ ................................................. A23L 1/00
[52] U.S. Cl. ........................................ 426/50; 426/52; 426/639
[58] Field of Search ................... 426/50, 52, 639, 442, 426/615

[56] References Cited

U.S. PATENT DOCUMENTS

| | | |
|---|---|---|
| 1,560,396 | 11/1925 | Navarre . |
| 1,703,730 | 2/1929 | Fraisse . |
| 1,870,588 | 8/1932 | Rooker et al. ........................ 426/50 |
| 2,326,407 | 8/1943 | Steinward . |
| 2,420,517 | 5/1947 | Brandner . |
| 2,726,958 | 12/1955 | Fisher . |
| 2,785,071 | 3/1957 | Mathews . |
| 2,801,925 | 8/1957 | Fisher . |
| 2,848,333 | 8/1958 | Fisher . |
| 2,865,758 | 12/1958 | Weckel . |
| 3,032,419 | 9/1958 | Limpert . |
| 3,219,461 | 11/1965 | Lamb . |
| 3,307,954 | 3/1967 | Blakemore ........................... 426/50 |
| 3,335,012 | 8/1967 | Bassett et al. ........................ 426/50 |
| 3,453,118 | 7/1969 | Jobin . |
| 3,516,838 | 6/1970 | Du Puis . |
| 3,623,893 | 11/1971 | Mauge . |
| 3,800,049 | 3/1974 | Larrocje . |
| 3,843,810 | 10/1974 | Fehmerling . |
| 3,904,774 | 9/1975 | Dymsza . |
| 3,984,580 | 10/1976 | Gur-Arieh . |
| 4,041,184 | 8/1977 | Bonacina . |
| 4,103,035 | 7/1973 | Fulger . |
| 4,256,772 | 3/1981 | Shanbhag . |

FOREIGN PATENT DOCUMENTS

| | | |
|---|---|---|
| 878427 | 8/1971 | Canada . |
| 529656 | 1/1921 | France . |
| 2070217A | 1/1981 | United Kingdom . |

OTHER PUBLICATIONS

Farkas, D. F. and Lazar, M. E.; "Osmotic Dehydration of Apple Pieces: Effect of Temperature and Syrup Concentration on Rates", May 1969; Food Technology 11, vol. 23, pp. 688–690.

Hawkes, J. and Flink, J. M.; "Osmotic Concentration of Fruit Slices Prior to Freeze Dehydration," 1978, Journal of Food Processing and Preservation, vol. 2, pp. 265–284.

Huxoll, C. C.; "Reducing the Refrigeration Load by Partial Concentration of Foods Prior to Freezing", Food Technology; May 1982, pp. 98–102.

Lerici, C. R.; "la Disidratazione Della Frutta Mediante Osmosi Diretta", Instituto di Industrie Agranie, University of Bologna; 1977, pp. 125–129.

*Primary Examiner*—Sam Rosen
*Attorney, Agent, or Firm*—Kenyon & Kenyon

[57] ABSTRACT

A process is described for rapidly infusing fruit with sugar solutes by means of an infusion bath which is maintained at a substantially constant solutes concentration and viscosity during the course of the infusion process by removing infusion solution; exposing the solution to an enzyme; concentrating the solution; and returning the concentrated solution to the original infusion bath.

13 Claims, 1 Drawing Figure

FRUIT INFUSION USING A SYRUP WHICH HAS BEEN SUBJECTED TO ENZYME TREATMENT AND CONCENTRATED

This is a division of application Ser. No. 466,411 filed Feb. 15, 1983, now U.S. Pat. No. 4,551,348.

FIELD OF THE INVENTION

This invention relates to the infusion of liquid-containing cellular products such as fruits or vegetables capable of undergoing osmotic exchange with a sugar solution.

BACKGROUND OF THE INVENTION

The preparation of infused fruit products has conventionally been carried out by adding fresh fruit to a tank containing a warm concentrated sugar solution or sugar syrup, and then stirring the fruit and sugar syrup together. Due to the greater amount of dissolved solids in the bath versus that present in the fruit, osmotic exchange takes place resulting in the infusion of sugar solids into the cellular portions of the fruit. During osmosis, the syrup diffuses inwardly into the fruit while water contained within the fruit undergoing infusion diffuses outwardly through the cell walls of the fruit.

A principal disadvantage associated with conventional fruit infusion processes is that the high bath concentrations necessary to infuse the fruit to the desired solutes level often cause the fruit to shrivel.

Although the rate of infusion of bath solutes into the fruit approximates the rate of water loss, or exfusion, from the fruit early in the infusion process, at later times the loss of water from the fruit continues at close to its initial rate while the influx of solutes into the fruit proceeds much more slowly. This loss of water from the fruit becomes more pronounced as the bath solutes concentration is increased, and is responsible for the undesirable shrinkage observed when highly concentrated infusion baths are employed.

Shrinkage could theoretically be reduced by use of a lower-concentration infusion bath, but infusion rates decrease with decreasing bath concentration. Also, the achievement of the desired solutes level in the fruit is further impeded by the concomitant dilution of the infusion bath by the fruit water, which unacceptably slows the infusion rate.

Shrinkage can be reduced by the use of a series of baths of gradually increasing concentration, but this approach is also slow and may present mechanical difficulties. However, due to the necessity to avoid osmotic shock, typical fruit infusion processes employ infusion times of 10 days to 2 weeks.

It is, therefore, an object of the present invention to provide a process for fruit infusion which allows a balance to be maintained between fruit water loss (dehydration) and bath solutes infusion so that the fruit solutes may be raised to the desired level before detrimental shrinkage due to dehydration occurs.

It is another object of the present invention to economically decrease the time required to achieve the desired dehydration infusion of fruit.

It is another object of the present invention to provide a process for fruit infusion wherein the fruit is infused to about the 32 to 58% solids level, and a water activity level of about 0.96 to 0.82, preferably 0.96–0.85.

SUMMARY OF THE INVENTION

The above objectives of the present invention are achieved by a process which permits the rapid infusion of fruit to the desired solutes level by means of an infusion bath which is maintained at a substantially constant solutes concentration and viscosity during the course of the infusion process. Such baths counteract the tendency of the infusion rate to decrease greatly due to the dilution of the bath by fruit water and thus avoid the need for the use of highly-concentrated infusion baths or a series of baths of increasing concentration. The process of the present invention also includes means for counteracting the undesirable thickening of the infusion bath due to exfusing fruit pectins.

DETAILED DESCRIPTION OF THE INVENTION

Figure 1:
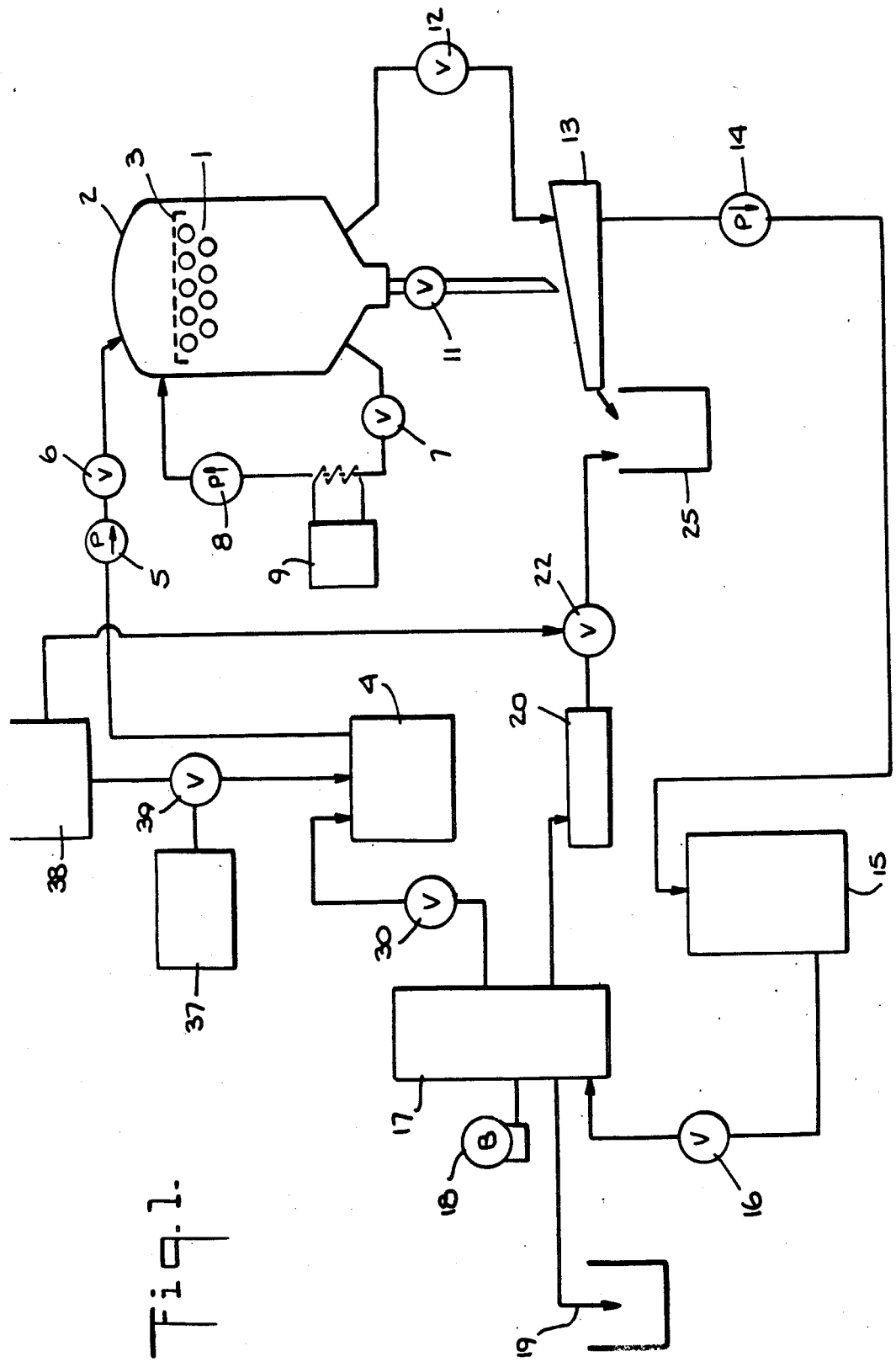

The fruits which may be infused in accordance with this invention include apples, cherries, strawberries, peaches, dates, pineapple, papaya, banana, nectarines, blueberries, raspberries, mango, elderberries, loganberries, raisins, mellons, kiwi (sapota), soursop, grapes, plums and the like. Any fruit which is capable of undergoing an osmotic exchange with a sugar solution without substantial collapse or damage to the internal cellular structure of the fruit product may be employed. Almost all fruits possess this property; however, it has been noted that the internal cellular structure of the Driscoll variety of strawberry collapses as a result of treatment with a fructose containing sugar solution. Thus, this strawberry type is incapable of undergoing osmotic exchange with sugar solids, while varieties such as Tioga and Senga Sengana are suitable for infusion by this process.

In general, prior to infusion the fruit is de-stemmed, the core is removed and the fruit is washed and dried. The removal of the stem of a fruit is sufficient to create a site for infusion of the sugar solids from the bath into the interstices of the fruit. However, where whole fruits are treated, additional sites may be created by pricking the skin of the fruit, or scarifying the fruit by providing longitudinal or latitudinal slits on the surface of the whole fruit. Alternatively, the fruit may be sliced, partially or entirely peeled, or sectioned into fruit pieces of the desired size prior to the infusion step. However, the steps taken to prepare the fruit for infusion may differ as a function of the properties, or ultimate use, of the particular fruit employed.

For example, when apples are to be infused, the whole fruit may be washed, peeled and the core removed. The apple is then cut into slices of the desired size. In order to prevent browning of the peeled apple slices upon exposure to air, the apple slices may be soaked in an edible aqueous salt or acid solution, e.g., about 0.1 to about 2% or higher aqueous sodium chloride, sodium metabisulfite, ethylenediamine tetraacetic acid or ascorbic acid solution.

When peaches are infused, the whole peach is washed, de-stemmed and the core is removed. The peach may then be cut into slices or the entire de-cored peach may be infused. Optionally, the peach skin is peeled away. The skin may be physically pared away with a knife or other conventional peeling device, or the skin of a peach (or other fruits) may be removed by immersing the fruit in an aqueous, about 3 to about 20%, and preferably about 5% caustic solution of sodium or calcium hydroxide. Browning of peeled peaches is prevented by washing the fruit, followed by bathing in about a 1% ascorbic acid solution.

When cherries are employed, they are de-stemmed and the pit is removed prior to infusion. Either sweet or sour cherries may be employed, including cherries of the following types: Morello, Montmorency, Oueen Ann, Tartarian or Bing cherries.

Prior to their addition to the infusion bath, strawberries are preferably de-stemmed, the core is removed and the skin of the strawberry is scarified by providing a group of surface slits in the body of the fruit in order to enhance the infusion process. Sliced strawberries may also be employed in the infusion process.

Fruits which have been previously frozen, as well as fresh fruits, may be infused. Frozen fruits are thawed under refrigeration, and any excess water or fruit juices are drained from the fruit prior to immersing the fruit in the infusion bath.

After the preliminary treatment, the fruit is infused with sugar solids by immersing the fruit in a circulating, solutes-containing bath comprised of a fructose containing solution.

The amount of infusion bath employed relative to the weight of fruit treated will vary, but in general a weight ratio of fruit to infusion bath of from about 0.1:1 to about 0.75:1, and preferably about 0.5:1, may be employed. During infusion the entire body of the fruit should be submerged in the bath.

The fruit is immersed in the solutes-containing infusion bath until the total water soluble solids content of the fruit is from about 32 to about 58%, preferably about 35 to about 50%, and most preferably about 40–45% water soluble solids. The foregoing percentages are weight percents, and the percentages given throughout this specification are weight percents unless otherwise specified.

FIG. 1 schematically illustrates one embodiment of an apparatus useful for carrying out the process of the present invention.

With reference to FIG. 1, inlet valve 6 is opened, and infusion tank 2 is loaded with an aqueous fructose containing, high-Brix syrup which is pumped into infusion tank 2 by pump 5 from high-Brix syrup holding tank 4. The prepared fruit 1 is then added to infusion tank 2, with valves 6, 7, 11 and 12 in the closed position. Valve 7 is opened, and the syrup is circulated through the infusion tank via pump 8 and heated by heater 9 to a temperature of about 60°–150° F., and preferably to a temperature of about 80°–125° F. to begin the infusion process. During infusion the fruit pieces 1 are held below the surface of the circulating syrup by screen 3.

Optionally, the loaded tank may be evacuated prior to beginning the syrup circulation. A preferred method of evacuation is to reduce the pressure above the syrup to about 20–30" of Mercury, return the pressure to one atmosphere, and to repeat this cycle 2–4 times to insure thorough degassing of the infusion mixture.

The initial solids concentration of the circulating syrup is set at about 30 to about 84% sugar solids, and preferably at about the 65–75% solids level. The circulation rate for 2500–3500 lbs. of syrup is preferably maintained at about 30–45 lbs./min. during the course of the infusion process.

The sugar component of the syrup is comprised of at least about 35 to about 100% fructose, and preferably about 42% to about 90% fructose. The balance of the sugar solids may be comprised of dextrose or any of a number of saccharide materials including monosaccharides, disaccharides and polysaccharides and their degradation products, e.g., pentoses including aldopentoses, ketopentoses like xylose and arabinose, a deoxyaldose like rhamnose, hexoses and reducing saccharides such as aldohexoses like glucose, galactose and mannose; the ketohexuloses, like sorbose and xylulose; disaccharides, like maltulose, lactose and maltose; nonreducing disaccharides such as a sucrose, other polysaccharides such as dextrin and raffinose, and hydrolyzed starches which contain as their constituents oligosaccharides. The balance of the sugar solids may be of a low molecular weight so as to offer a substantial effect in increasing the osmotic pressure of the sugar solution. The balance of the sugar solids may also be comprised of polyhydric alcohols such as glycerol and the like. When polyhydric alcohols are employed, they preferably comprise only about 1 to about 10% of the sugar component.

A commercially available fructose-dextrose corn syrup may be adjusted to the desired percent sugar solids by water addition, and employed as the sugar-containing infusion bath of the present infusion process. The sugar solids component of suitable 70–80 Brix fructose-dextrose syrups may be comprised of about 50% dextrose, 42% fructose, 1.5% maltose, 1.5% isomaltose, and 5% high saccharides (i.e., Isosweet ®, A. E. Staley, Decater, Ill.); or 55% fructose and 42% dextrose, or 90% fructose and 10% dextrose.

When the fruit is contacted with the, e.g., 69–71 Brix syrup and the infusion process begun, the syrup solutes concentration initially drops, for example, to 55–65%, as the syrup is diluted with exfusing and surface fruit water. However, employing the process of the present invention, the syrup solutes concentration is rapidly stabilized, preferably at about 62–67%, during the remainder of the infusion process, i.e., until the water-soluble fruit solids have increased from about 9–11% to the desired 35–50%.

During the infusion process of the present invention, the concentration of the infusion bath is stabilized by intermittently, or preferably by continuously adding fresh high Brix syrup into infusion tank 2 and withdrawing diluted syrup from the tank via outlet valve 12. The high Brix syrup is adjusted to the desired sugar concentration by premixing a commercially available syrup such as high fructose corn syrup from tank 37 with fixed amounts of pasteurized low Brix syrup from tank 38 via mixing valve 39. The rate of introduction of syrup into the tank, and the rate of removal of syrup via outlet valve 12 is adjusted so that the rate of depletion of sugar solids from the bath due to infusion of sugar solids into the fruit and concomitant dilution of the bath with fruit water is at least about equal to, or is slightly less than the rate of enrichment of the sugar solids resulting from the continuous introduction of fresh sugar syrup from high Brix syrup holding tank 4 via inlet valve 6. During the infusion process, the level of syrup in the infusion tank 2 remains about constant, and the concentration of sugar solids in the infusion bath is likewise stabilized at a constant value.

The syrup withdrawn from tank 2 is periodically monitored for solutes content, for example, every 30 minutes at outlet valve 12 by means of a Brix-calibrated refractometer. See Analytical Methods 31.011 and 22.018, AOAC, 13th ed. (1980). In the event that the sugar solutes content of the exiting syrup falls below the desired level, it is enriched by increasing the influx of fresh syrup from holding tank 4, while simultaneously increasing the outflow of diluted syrup via outlet valve 12. To maintain an infusion bath at about a 65% solutes level employing 70-75 Brix syrup inflow into a 600 gallon infusion tank containing about 2900 lbs. of syrup and about 1200 lbs. of fruit, an inflow/outflow rate of about 2-9 gal./min. may be employed, preferably the rate will be fixed at about 5-7 gal./min.

As will be explained hereinbelow, the outflowing syrup will be treated by the method of the present invention so as to decrease its viscosity and increase its concentration so that it may be returned to the high Brix holding tank 4 in a condition suitable for reintroduction into the infusion tank 2. This treatment enables the instant fruit infusion process to be carried out while minimizing the use of large amounts of fresh syrup, i.e., from tanks 37 and 38, beyond the amounts required for the initial loading of the infusion tank.

In accord with the practice of the present invention, the 50-60 Brix syrup stream which exits the infusion tank via outflow valve 12 is first passed through a strainer 13 to remove solid matter such as pulp, seeds, and the like.

During the infusion process, pectin lost from the infused fruit greatly increases the viscosity of the syrup. The viscosity would be increased further if this syrup were to be subjected to an evaporation step to increase the sugar solids content. The increased viscosity acts to slow the infusion process as well as to decrease the flow rate of the syrup. The filtered syrup stream is, therefore, moved via pump 14 into a treatment tank 15 where it is titrated with an amount of a pectolytic enzyme ("pectinase") sufficient to substantially digest the fruit pectin present in the syrup and thus to lower the viscosity of the syrup. Useful pectolytic enzymes include Ultrazym ® and Pectinex ® 3XL (Novo Laboratories, Inc., Wilton, Conn.)

It has been found that the addition of about 1 oz. of commercially available pectinase per 1000 gal. of syrup is sufficient to lower the syrup viscosity from about 100 cps (as measured with pectinase at about 22° C.) to less than or about 50 cps so that the concentration step can be efficiently performed.

After enzyme treatment in tank 15, the syrup is admitted via valve 16 into a short-time, multiple effect, multistage ("flash") evaporator 17 in order to raise the solutes concentration of the syrup to the desired 70-74 Brix. The syrup is quickly heated to about 186° F. via boiler 18 under a vacuum of about 26-27 inches of mercury. This drives off sufficient water to raise the solutes concentration of the syrup stream to at least 70 Brix, a concentration at which the syrup is microbiologically stable if surface-protected. The concentrated syrup exits from the evaporator at about 80° F. and returns to the high Brix holding tank 4 via valve 30, from which it may be pumped back into the infusion tank, thus completing the reconcentration loop. As noted hereinabove, syrup is continuously passed through this loop at about 2-9 gal./min. as soon as treatment tank 15 accumulates a sufficient amount of enzyme-treated syrup.

One flash evaporator which is useful in the practice of the present invention is the T.A.S.T.E. ® (thermally-activated, short-time evaporator) manufactured by Gulf Machinery, Safety Harbor, Fla. This evaporator is able to produce reconcentrated syrup at the rate of about 500 gal./hr. The steam which escapes from the boiling syrup carries with it much of the fruit essence, or essential flavor oils. The T.A.S.T.E. ® evaporator also separates the fruit essence from the bulk of the distillate. The essence is accumulated in holding tank 20 while the excess waste water is drained off via outlet 19.

The progress of the infusion is followed by periodically removing fruit pieces from the infusion tank, rinsing them and blotting them to free them of surface syrup and then squeezing out a portion of internal juice which is checked for total solutes via a refractometer.

When the fruit has been infused to the desired solutes level, i.e., to 35-50% solutes, the circulation pumps are stopped and valves 6, 7 and 12 closed. The infusion syrup is then drained from the infusion tank 2 via outlet valve 12 and processed as described hereinabove. The infused fruit is then dumped from the tank via outlet valve 11, and drained and cooled to 20°-30° C. on screen 13. The fruit may then be packed in containers 25 for shipment. Preferably infused fruit is packed with syrup of the same Brix in a syrup to fruit w/w ratio of 1:3-6. In the packing step, for example, 400 lbs. of 40-45 Brix infused fruit is packed with 100 lbs. of 40-45 Brix syrup which is introduced into container 25 from holding tank 38 along with an appropriate amount of fruit essence from holding tank 20 via mixing valve 22.

Alternatively, the infused fruit can be readily dried, i.e., freeze or oven-dried, to about the 15-28% moisture level without undue shrivelling and while maintaining satisfactory organoleptic properties.

The invention will be further described by reference to the following detailed examples.

EXAMPLE I

Infusion of Apples

Fresh Golden Delicious Apples were washed, peeled, wiped, sliced and soaked in a 2% solution of sodium metabisulfite solution for one hour. A 650 gal. infusion tank was charged with 1225 lbs. of the apple slices (10.5 Brix) which were suspended in 2870 lbs. of 69 Brix high fructose corn syrup (fructose/total sugar solids=0.42) which was pumped through the heated circulation loop at 40 gal./min. and heated to 120° F. A drop in the concentration of the bath from 69 Brix to 60 Brix was observed during the first 30 minutes of the infusion process at which point fresh syrup was introduced into the tank and diluted syrup withdrawn from the tank at a rate of 5 gal./min. After 30 minutes, the bath concentration had stabilized 65-67 Brix. The run was terminated after 110 minutes, at which point the syrup Brix was 66.3 and the fruit Brix had been raised to 46.5, while the total fruit weight had dropped to 726 lbs. The infused apple slices were judged excellent in taste and texture and exhibited minimal browning and shrinkage.

EXAMPLE II

Fruit Infusion

The results of nine infusion runs employing the general method of Example I are summarized in Table I. In all cases the bath was heated and recirculated at 40 gal./min. Syrup was concentrated and returned to the bath at a rate of 4.0 gal./min. in all runs with the exception of IIA (5.0.), IIF (2.6) and IIH (2.0). The weight of fruit infused was 1200 lbs. (strawberries), 900 lbs. (peaches), 192 lbs. (grapes, I), and 385 lbs (grapes, J).

| RUN | FRUIT | INITIAL SYRUP BRIX (WT.) | STABILIZED SYRUP BRIX | INITIAL FRUIT BRIX | FINAL FRUIT BRIX (WT.) | RUN TIME (TEMP.) | FRUIT QUALITY* |
|---|---|---|---|---|---|---|---|
| A | Sliced Strawberries (Tioga) | 65 (2750 lbs.) | 65 | 9.0 | 40 (625 lbs.) | 2.25 hr. (120° F.) | Excellent |
| B | Sliced Strawberries (Tioga) | 71 (2872) | 63.1 | 9.5 | 38.5 (699) | 1.25 hr. (110° F.) | Excellent |
| C | Sliced Strawberries (Tioga) | 71 (2872) | 64.5 | 9.5 | 40 (702) | 1.75 hr. (114° F.) | Excellent |
| D | Whole Strawberries | 71 (2872) | 58.5 | 9.5 | 40.5 (740) | 1.25 hr. (117° F.) | Good |
| E | Whole Strawberries | 67 (2872) | 64 | 9.0 | 40 (650) | 6.0 hr. (121° F.) | Fair |
| F | Sliced Peaches | 69 (2870) | 60.0 | 10.5 | 40.0 (542) | 3.0 hr. (130° F.) | Excellent |
| G | Sliced Peaches | 71.0 (3420) | 64.5 | 10.1 | 39.5 (486) | 2.0 hr. 120° F.) | Excellent |
| H | Sliced Peaches | 71 (2964) | 66.3 | 11 | 45 (514) | 3.5 hr. (110° F.) | Poor |
| I | **Grapes | 69.3 (3762) | 68.5 | 18.0 | 41.0 (109) | 7.5 hr. (137° F.) | Good |
| J | **Grapes | 50.0 (3850) | 66.8 | 19.0 | 37.0 (247) | 7.5 hr. (135° F.) | Excellent |

*Taste, Color and Shrinkage.
**Thompson Seedless grapes prepared by de-stemming and scarification. The infused grapes were drained, rinsed and freeze-dried to an 18% moisture level. "Fruit Quality" is that of the infused fruit before drying.

It can be seen from the above examples that a variety of fruits can be rapidly infused to a high solutes level by the process of the present invention. Generally, the quality of the fruit decreased for longer infusion times, the fruit becoming overly soft and fragile and losing color. Grapes, even when pre-punctured, required longer than average infusion times due to the density of the membrane. However, grapes were also more resistant to shrinkage, softening, etc. Infusion times of 1.0-3.0 hrs. gave excellent quality fruit in the case of sliced strawberries, sliced apples, and sliced peaches in that the color and flavor were not adversely effected and little or no shrinkage was observed.

While certain representative embodiments of the invention have been described herein for the purposes of illustration, it will be apparent to those skilled in the art that modifications therein may be made without departing from the spirit and scope of the invention.

We claim:

1. A process for infusing fruit with sugar solutes comprising:
   (a) suspending the fruit in a rapidly circulating heated aqueous bath initially incorporating about 30-84 percent dissolved sugar solutes, said sugar solutes being comprised of about 35 to about 100 percent fructose;
   (b) inhibiting dilution of the bath caused by exfusing fruit water by introducing concentrated sugar solution into the bath and withdrawing substantially equal amounts of diluted syrup so as to stabilize the bath solutes concentration;
   (c) enzymatically treating the withdrawn, diluted syrup so as to reduce its pectin viscosity;
   (d) concentrating the diluted syrup evaporation;
   (e) returning the concentrated syrup to the infusion bath; and
   (f) withdrawing the fruit from the bath when the concentration of sugar solutes has been raised to the desired level before detrimental shrinkage occurs.

2. The process of claim 1 wherein the bath dilution is inhibited by continuously introducing the concentrated sugar solution while simultaneously withdrawing equal amounts of diluted syrup.

3. The process of claim 1 wherein the initial concentration of dissolved sugar solutes in the bath is set at about 65-75 percent and the solutes concentration is stabilized at about 62-67 percent.

4. The process of claim 1 wherein the diluted syrup is concentrated to about 70-75 percent solids.

5. The process of claim 1 wherein the diluted syrup is treated with an amount of pectinase to effectively lower its viscosity.

6. The process of claim 1 wherein the bath is heated to about 80-125° C. and circulated at about 35-45 gal/min and the concentrated syrup is introduced into the bath at about 2-9 gal/min.

7. The process of claim 1 wherein the fruit is infused to a final solutes content of about from 32-58%.

8. The process of claim 1 wherein the fruit infused is selected from the group consisting of strawberries, peaches, grapes, apples, raisins, cherries, bananas, papaya, blueberries, mellons, pineapple, kiwi, soursop, raspberries, mango, plums and loganberries.

9. The process of claim 1 wherein said evaporation is accomplished by means of a flash evaporator.

10. The process of claim 9 wherein said evaporation accomplishes the isolation of a substantial portion of the fruit essence which is returned to the fruit after the infusion process has been completed.

11. The process of claim 7 further comprising isolating the infused fruit and drying the infused fruit to a moisture level of about 15–28%.

12. A process for infusing fruit with sugar solutes comprising:
(a) suspending the fruit in a heated aqueous bath which is circulated at about 35–45 gal./min., said bath initially incorporating about 65–75 percent dissolved sugar solutes, said sugar solutes being comprised of about 35 to about 100 percent fructose;
(b) inhibiting the dilution of a bath caused by exfusing fruit water by introducing a concentrated sugar solution into the bath and withdrawing substantially equal amounts of diluted syrup at a rate of about 2–9 gal/min so as to stabilize the bath solutes concentration;
(c) enzymatically treating the withdrawn diluted syrup so as to reduce its pectin viscosity;
(d) concentrating the withdrawn, diluted syrup by evaporation;
(e) returning the concentrated syrup to the infusion bath; and
(f) withdrawing the fruit from the bath when the concentration of sugar solution has been raised to the desired level before detrimental shrinkage occurs.

13. The process of claim 12 wherein the diluted syrup is treated, in step (c), with pectinase to reduce its viscosity to less than or about 50 cps as measured at about 22° C.

* * * * *